United States Patent
Ross et al.

(10) Patent No.: US 9,193,618 B2
(45) Date of Patent: Nov. 24, 2015

(54) GLASS ALIGNMENT FOR HIGH TEMPERATURE PROCESSES

(71) Applicants: Donald Ross, San Jose, CA (US); Adam Stagnaro, Santa Cruz, CA (US); Matthew Theobald, San Francisco, CA (US); Andrew Davidson, Sunnyvale, CA (US); Michael Kane Pilliod, San Francisco, CA (US)

(72) Inventors: Donald Ross, San Jose, CA (US); Adam Stagnaro, Santa Cruz, CA (US); Matthew Theobald, San Francisco, CA (US); Andrew Davidson, Sunnyvale, CA (US); Michael Kane Pilliod, San Francisco, CA (US)

(73) Assignee: Apple Inc., Cupertino, CA (US)

(*) Notice: Subject to any disclaimer, the term of this patent is extended or adjusted under 35 U.S.C. 154(b) by 239 days.

(21) Appl. No.: 13/665,779

(22) Filed: Oct. 31, 2012

(65) Prior Publication Data
US 2014/0116094 A1    May 1, 2014

Related U.S. Application Data

(62) Division of application No. 12/401,573, filed on Mar. 10, 2009, now Pat. No. 8,336,334.

(51) Int. Cl.
*C03B 23/025* (2006.01)

(52) U.S. Cl.
CPC ......... *C03B 23/0252* (2013.01); *C03B 2225/02* (2013.01)

(58) Field of Classification Search
USPC .................................................. 65/107, 323
See application file for complete search history.

(56) References Cited

U.S. PATENT DOCUMENTS

| | | | |
|---|---|---|---|
| 2,840,953 A | 7/1958 | Black | |
| 3,060,708 A | 10/1962 | Allwin | |
| 5,024,474 A | 6/1991 | Selby | |
| 5,069,046 A | 12/1991 | Moulding | |
| 5,090,989 A | 2/1992 | Adoline | |
| 8,336,334 B2 | 12/2012 | Ross et al. | |
| 2005/0088069 A1 | 4/2005 | Greenwald et al. | |
| 2010/0229602 A1 | 9/2010 | Ross | |
| 2011/0072856 A1 | 3/2011 | Davidson et al. | |

OTHER PUBLICATIONS

International Search Report and the Written Opinion for International Application No. PCT/US2010/025868, mailed Jun. 29, 2010.
Examination Report for EP Patent Application No. 10708049.1, dated Aug. 17, 2012.
Restriction Requirement for U.S. Appl. No. 12/401,573, mailed Sep. 8, 2011.
Office Action for U.S. Appl. No. 12/401,573, mailed Oct. 17, 2011.
Final Office Action for U.S. Appl. No. 12/401,573, mailed May 11, 2012.

(Continued)

*Primary Examiner* — Joseph S Del Sole
*Assistant Examiner* — Russell Kemmerle, III

(57) ABSTRACT

Apparatus, systems and methods for alignment of a glass member for high temperature processing are disclosed. The high temperature processing can, for example, pertain to a slumping process to mold glass into a predetermined shape (e.g., a three-dimensional shape). In one embodiment, a glass slumping system can have a mold and an alignment system that support a glass member to be slumped relative to the mold. The alignment system may have a plurality of alignment members being configured to move away from the glass member as the temperature increases during the slumping process to allow the glass member to bend around the mold without interference.

25 Claims, 12 Drawing Sheets

(56) References Cited

OTHER PUBLICATIONS

Notice of Allowance for U.S. Appl. No. 12/401,573, mailed Aug. 2, 2012.
Office Action for Chinese Patent Application No. 201080011080.0, mailed Aug. 5, 2013.
Office Action for Chinese Patent Application No. 201080011080.0, mailed Apr. 15, 2014.
Office Action for European Patent Application No. 10708049.1, mailed Aug. 17, 2014.

GLASS ALIGNMENT FOR HIGH TEMPERATURE PROCESSES

CROSS-REFERENCE TO RELATED APPLICATION

This application is a divisional application of U.S. patent application Ser. No. 12/401,573, filed on Mar. 10, 2009 and entitled "GLASS ALIGNMENT FOR HIGH TEMPERATURE PROCESSES", which is hereby incorporated herein by reference.

FIELD OF THE INVENTION

The present disclosure relates generally to glass shaping processes and, more particularly, to aligning glass in high temperature processes such as glass slumping processes.

BACKGROUND OF THE INVENTION

Various processes have been proposed for slumping glass or shaping glass to impart a bend or curvature thereto. One process is a "dropout" process. Vacuum forming processes have also been used to shape glass softened by heating. However, numerous disadvantages and drawbacks are associated with the dropout and vacuum forming processes for slumping glass. These processes utilize fixed alignment systems to secure the edges of the glass to the molds. However, these fixed alignment systems can inhibit the glass from dropping or sagging into the cavities of the molds. This results in formation of protruding, perimetrical flanges in the glass after shaping, such flanges circumscribing or surrounding portions of the glass that have been allowed to drop or sag into the cavities. Depending on the intended use for the shaped glass, such flanges may be undesirable and require removal. Removal of the flanges adds additional cost, labor and time to the glass shaping processes.

Another drawback is that the glass tends to be undesirably stretched when they drop or sag into the molds. Additionally, although dropout processes are effective for relatively thick (e.g. ½ to 1 inch thick) glass, such processes are generally unsuitable for relatively thin (e.g. ¼ inch thick or less) glass. Most dropout processes involve heating the glass relatively rapidly, which is detrimental to relatively thin glass and/or "art" glass. Some dropout processes also involve multiple heating cycles (firings), movement of the glass during heating, repositioning of the glass in or on the molds and/or transfers of the glass between different molds, thusly adding undesirably to the complexity, cost, time and labor for the glass shaping processes.

Furthermore, these processes typically involve contacting the glass with chemicals, gases or extraneous mechanical components, which is undesirable. Additionally, when vacuum forming, the glass may crack or otherwise be impaired due to inconsistencies or lack of control in the applied vacuum. Moreover, the appearance of the glass may be undesirably altered due to application of the vacuum, which is a significant drawback when aesthetics are important. Furthermore, in each of these processes, after the glass is slumped, the glass must still be grinded to form the finished edges.

SUMMARY

The invention pertains to apparatus, systems and methods for alignment of a glass member for high temperature processing. The high temperature processing can, for example, pertain to a slumping process to mold glass into a predetermined shape (e.g., a three-dimensional shape).

The apparatus, systems and methods for alignment of a glass member for high temperature processing are suitable for glass covers assembled in small form factor electronic devices, such as handheld electronic devices (e.g., mobile phones, media players, user input devices (e.g., mouse, touch sensitive devices), personal digital assistants, remote controls, etc.). The apparatus, systems and methods can also be used for glass covers or displays for other relatively larger form factor electronic devices (e.g., portable computers, tablet computers, displays, monitors, televisions, etc.).

The invention can be implemented in numerous ways, including as a method, system, device, or apparatus (including computer readable medium). Several embodiments of the invention are discussed below.

In one embodiment, a glass slumping system described herein can have a mold and an alignment system that support a glass member to be slumped relative to the mold. The alignment system can have a plurality of alignment members being configured to move away from the glass member as the temperature increases during the slumping process to allow the glass member to bend around the mold without interference.

In another embodiment, an apparatus to slump a glass member in a slumping process can have a mold having a top surface, and a plurality of alignment members arranged to align the glass member with respect to the top surface of the mold. Each of the plurality of alignment members can be configured to move away from the glass member as the temperature increases during the slumping process to allow the glass member to bend around the mold without interference.

In one embodiment, a glass slumping method may include removably securing a bottom end of a plurality of alignment members to a mold; supporting and aligning a glass member on the mold wherein each of the plurality of alignment members contact the glass member to retain the glass member in position; heating the glass member, moving each of the plurality of alignment members away from the glass member as the glass member is heated to allow the glass member to bend around the mold without interference, thereby releasing the heated glass member from the alignment members; and cooling the glass member after being bent around the mold.

The present invention provides other embodiments configured to implement the aspects of the invention, as well as software (or computer program code) stored in a machine-readable medium (e.g., a tangible storage medium) to control devices to perform these methods.

Other aspects and advantages of the invention will become apparent from the following detailed description taken in conjunction with the accompanying drawings which illustrate, by way of example, the principles of the invention.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

DETAILED DESCRIPTION OF EMBODIMENTS OF THE INVENTION

Figure 1A:
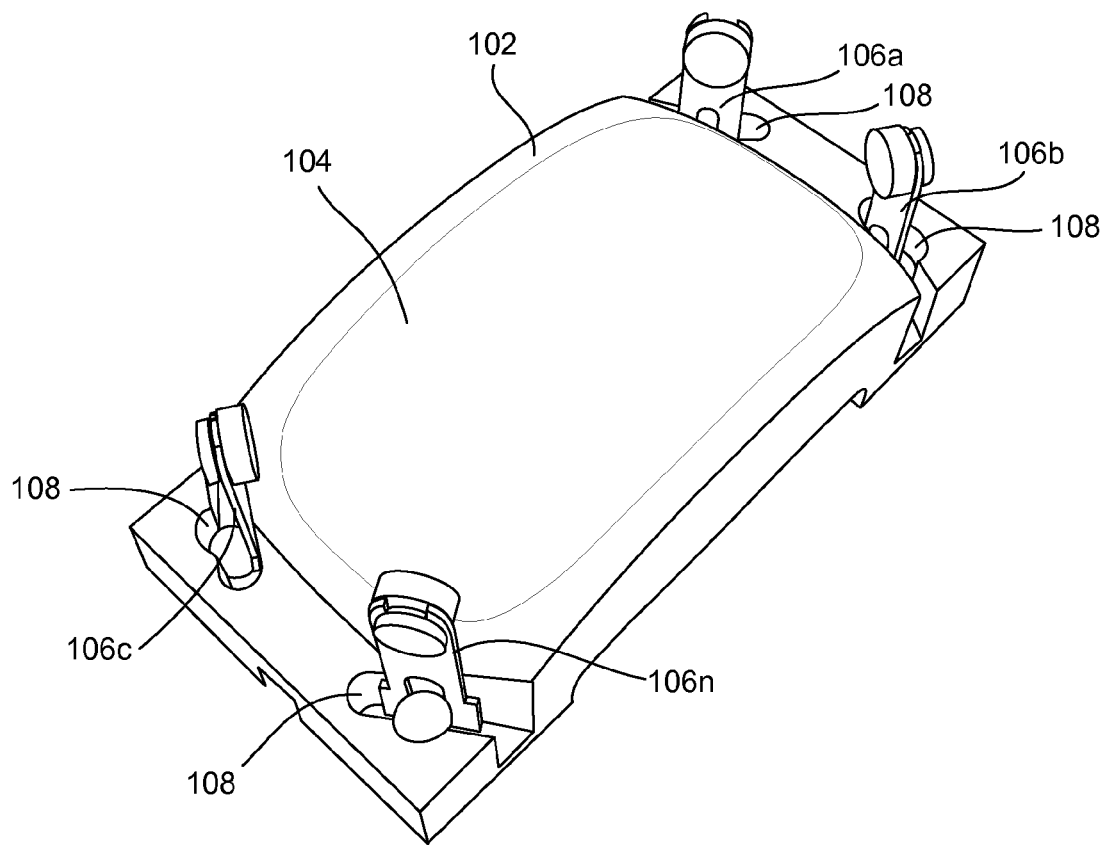
FIGS. 1A and 1B illustrate a perspective view of one embodiment of an alignment system.

The invention pertains to apparatus, systems and methods for alignment of a glass member for high temperature processing. The high temperature processing can, for example, pertain to a slumping process to mold glass into a predetermined shape (e.g., a three-dimensional shape).

The apparatus, systems and methods for alignment of a glass member for high temperature processing are suitable for glass covers assembled in small form factor electronic devices, such as handheld electronic devices (e.g., mobile phones, media players, user input devices (e.g., mouse, touch sensitive devices), personal digital assistants, remote controls, etc.). The apparatus, systems and methods can also be used for glass covers or displays for other relatively larger form factor electronic devices (e.g., portable computers, tablet computers, displays, monitors, televisions, etc.).

Embodiments are described herein in the context of aligning glass for high temperature processes. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

An alignment system, as described herein, can be used to position glass on complex three-dimensional molds in high temperature processes, such as slumping. Without proper alignment or if there is a shift in alignment, each glass formed on the mold will have a different shape. Current systems to align glass utilize fixed alignment systems, which has the disadvantages as discussed above. Additionally, with current systems, the glass is typically grinded after the slumping process is completed to thereby shape the glass with finished edges. A movable alignment system is described herein aligns finished glass so that the glass does not need to be machined (e.g., grinded) after the high temperature process. Additionally, the alignment system may reference the glass member to the proper location on the mold. For example, the alignment system may align the center of the glass with the center of the mold. This allows for the consistent shape and formation of the glass members, which provides for consistent repeatability in the formation of each glass.

Figure 1B:
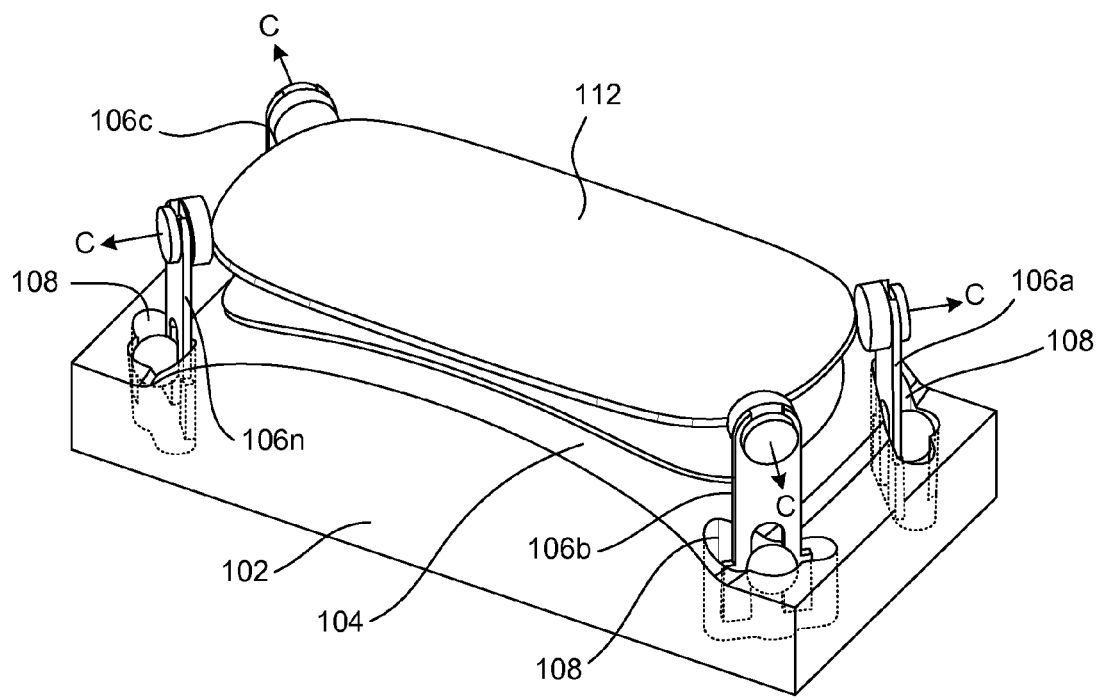

FIGS. 1A and 1B illustrate a perspective view of one embodiment of an alignment system. FIG. 1A illustrates a perspective view of the assignment system coupled to a mold 102 and FIG. 1B illustrates a perspective view of a glass member 112 aligned on the mold 102 with the alignment system. The mold 102 has a top surface 104. As illustrated, the top surface 104 has a convex three-dimensional (3D) contour surface. However, this is not intended to be limiting as the top surface may be any 3D formation, such as a concave 3D contour formation. The mold 102 may be formed of any high temperature resistant material, such as ceramic.

The mold 102 may have a plurality of slots 108 adjacent the top surface 104 to support an alignment system. The alignment system may have a plurality of alignment members 106a-n (where n is an integer).

As illustrated in FIGS. 1A and 1B, the slots 108 are located at each corner 110 of the mold 102. However, the location of the slots 108 are not intended to be limiting as the slots 108 may be positioned at any location on the mold 102 as is necessary to align the glass member 112 on the mold 102. Additionally, although illustrated with four alignment members 106a-d, this number is not intended to be limiting as any number of alignment members may be used as necessary to align the glass member 112 on the mold 102.

Figures 2A, 2B:
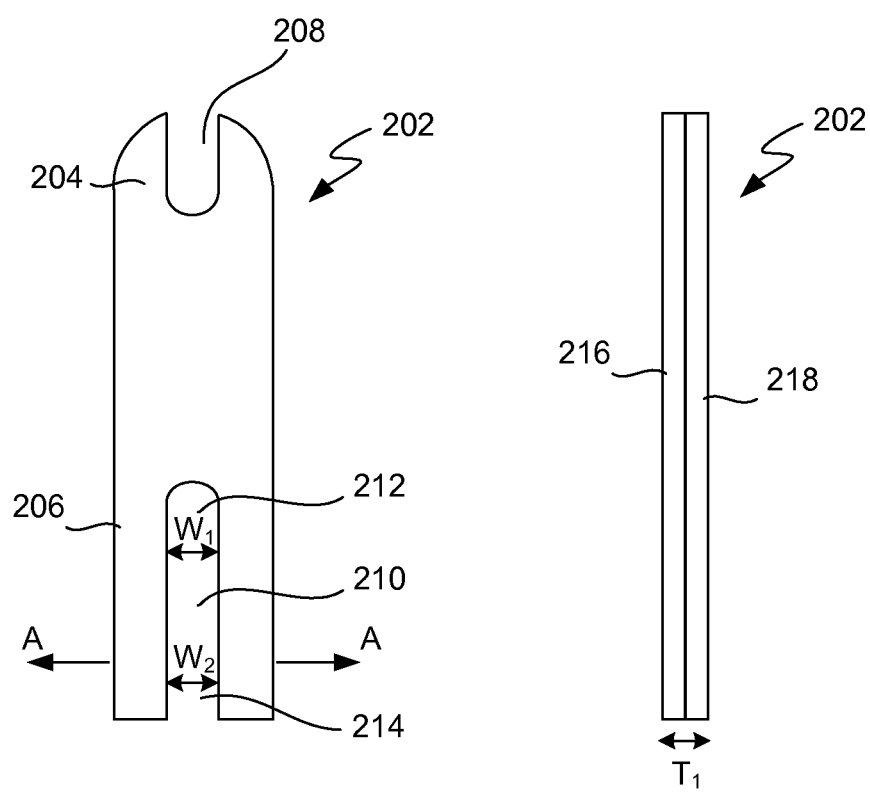
FIGS. 2A and 2B illustrate an embodiment of an alignment member.

FIGS. 2A and 2B illustrate an embodiment of an alignment member 202. FIG. 2A illustrates a front view of the alignment member 202 and FIG. 2B illustrates a side view of the alignment member 202. Referring to FIG. 2A, the alignment member 202 may have a first open-mouth opening or slit 208 at a top end 204 and a second open-mouth opening or slit 210 at a bottom end 206. The first opening 208 may be configured to receive a contact member as discussed in detail below with reference to FIG. 3A. The second opening 210 may be configured to receive a retention member as discussed in detail below with reference to FIG. 3A.

The second opening 210 may have an upper end 212 and a lower end 214. The upper end 212 may have a width, W1, that is greater than a width, W2, of the lower end 214. In one embodiment, W1 is between about 0.5% to about 3% greater than W2. In a specific embodiment, W1 is about 2% greater than W2. As discussed in more detail below, as the temperature increases during the slumping process, the lower end 214 expands in the direction of arrows A, which causes W2 to increase. The retention member (FIG. 3A) may then drop from the upper end 212 to the lower end 214, yet still releasably secure the alignment member 202 to the mold 102.

Referring to FIG. 2B, the alignment member 202 may be bi-metallic (e.g. formed from two different metals) and have a thickness, T1, of between about 0.25 mm to about 5 mm. In one embodiment, a first metal 216 may be a nickel alloy, such as Hastelloy-X, that has a coefficient of thermal expansion (CTE) of about 16 ppm/K. The second metal 218 may be an alloy steel or steel, such as 316 stainless steel, that has a CTE of about 17 ppm/K. The type of metal is not intended to be limiting as any type of metal may be used, such as titanium. The two metals may be joined together using any known process such as cladding, spot welding, or any other similar processes.

At high temperatures, the alloy steel expands at a slightly faster rate than the nickel alloy. Thus, this causes the alignment member 202 to bend in the direction toward the alloy steel, or the metal with the higher CTE.

In one embodiment, the CTE for each metal is substantially similar, for example, a CTE difference of about 1 to 5 ppm/K, which results in a slight bend of the alignment member during heating. In one example, at higher temperatures, the alignment member 202 bends to form between about a 0.25 mm to about a 1 mm displacement arc. The displacement arc formed during heating may be dictated by the difference in CTE between the metals. For example, as the difference between CTE of the metals increases, the displacement arc will also increase.

Although FIG. 2B illustrates the alignment member 202 as substantially straight and planar, it will now be known that the alignment member 202 may be of any form. For example, the alignment member 202 may have a slight bend at the top end 204 or the bottom end 206 in order to contact the glass member 112 on the mold 102. Additionally, the alignment member 202 may take any shape or form necessary to align the glass member to the mold. Moreover, although the alignment member 202 is illustrated as being bi-metallic, this is not intended to be limiting as alignment member may be formed from a single metal, such as steel, as described below with reference to FIGS. 5 and 6.

Figure 3A:
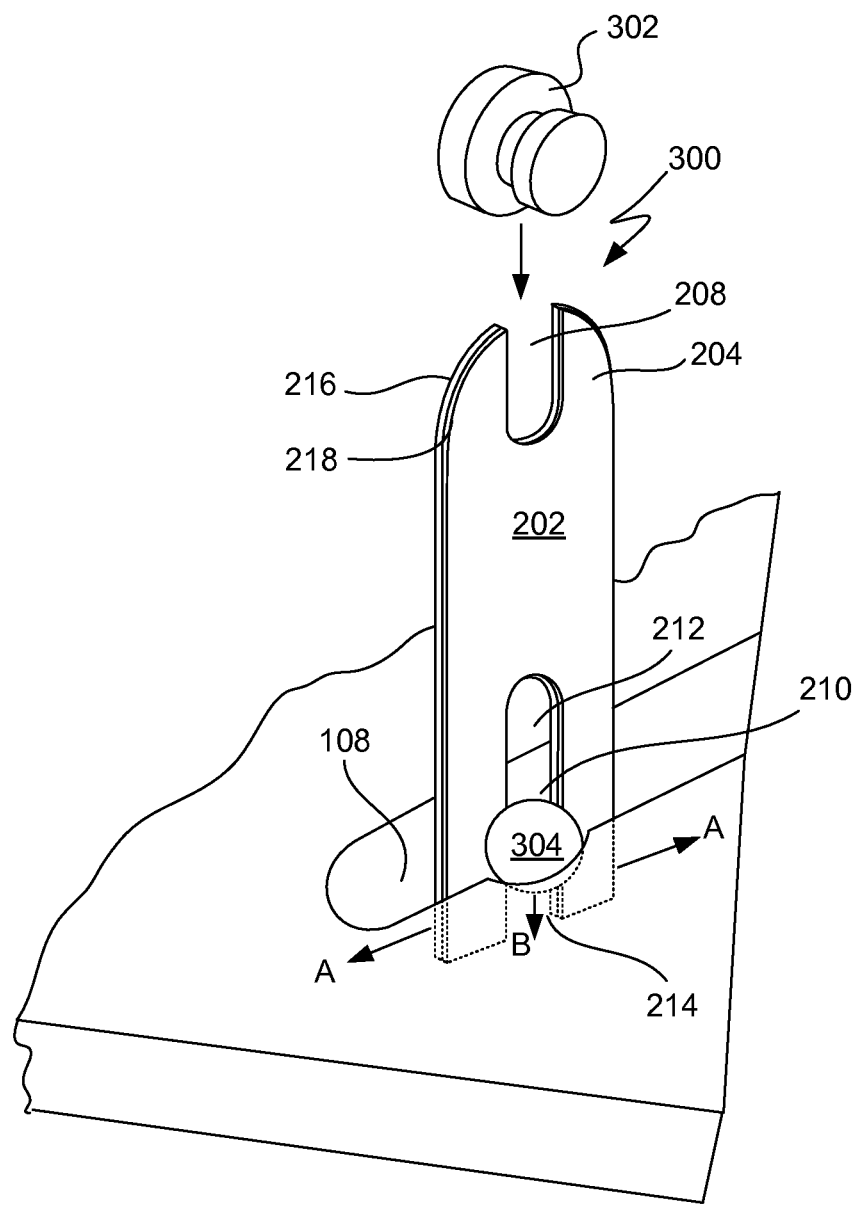
FIGS. 3A-3C illustrate an embodiment of an alignment system secured to the mold with a ball.
Figure 3B:
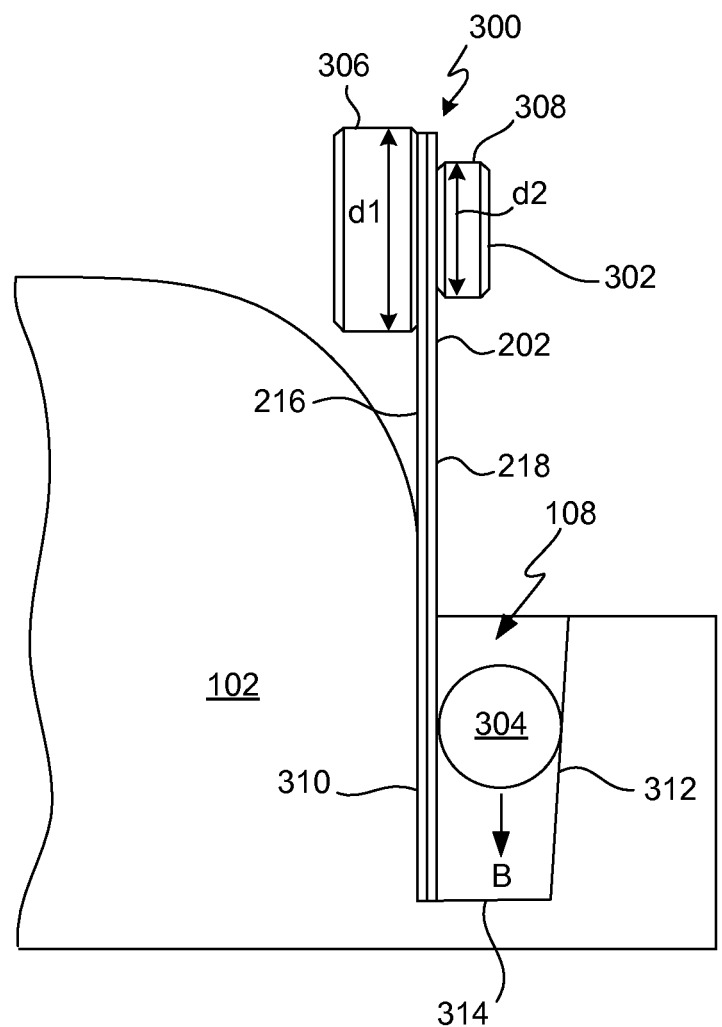
Figure 3C:
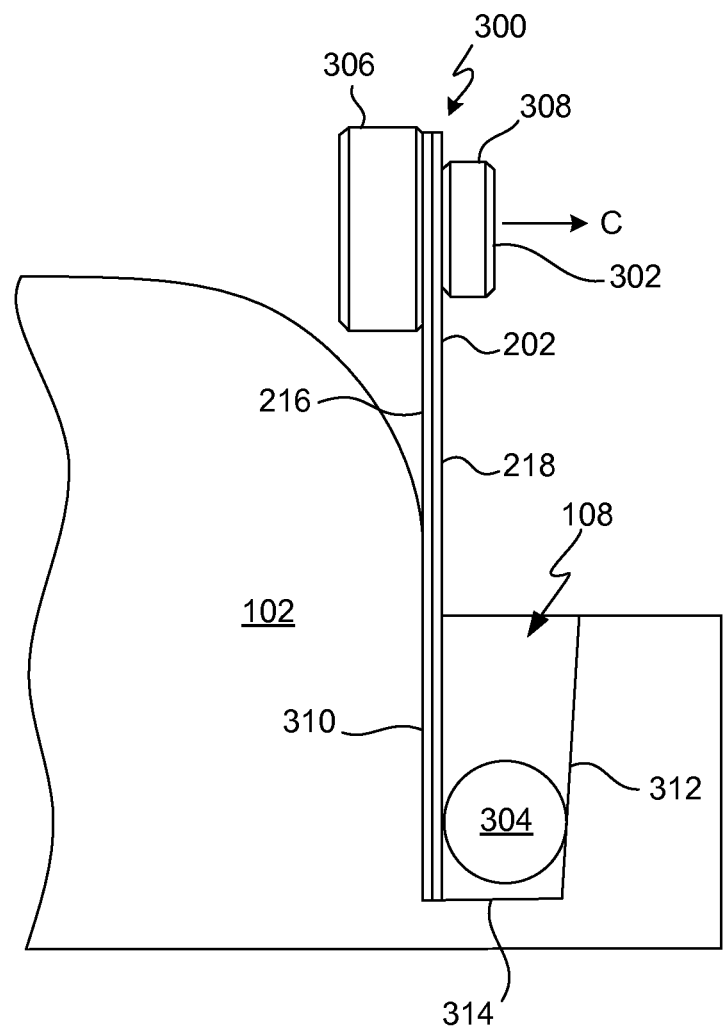

FIGS. 3A-3C illustrate an embodiment of an alignment system 300 secured to the mold 102 with a ball 304. FIG. 3A is a perspective view of the alignment system 300 and FIGS. 3B and 3C are side views of the alignment system 300. This embodiment provides for an alignment system using an alignment member that allows for the continuous movement of the alignment member in a direction away from the glass member.

Referring to FIG. 3A, the first opening 208 may be configured to receive a contact member 302. If the glass member 112 is in direct contact with the alignment member 202, a high concentration of heat can result at the contact point between the glass member 112 and the metal alignment member 202. Thus, the contact member 302 can be used as a buffer between the alignment member 202 and the glass member 112. The contact member 302 may be configured to apply a slight interference to the glass member 112 to align and secure the glass member to the mold 102. The contact member 302 may be formed from any high temperature material, such as ceramic. In one embodiment, the contact member 302 is formed from a material similar to the glass member 112.

As illustrated, the contact member 302 can be shaped similar to a barbell. However, this is not intended to be limiting as the contact member 302 may be form or shape desired such that it is able to be coupled to the alignment member 202.

Referring to FIG. 3B, the contact member 302 may be formed of a first surface 306 and a second surface 308. The first surface 306 has a substantially planar surface to contact the glass member. As illustrated, the first surface 306 has a diameter, d1, that is less than the diameter, d2, of the second surface 308. However, this is not intended to be limiting as d2 may be equal to or greater than d1.

Referring back to FIG. 3A, the second opening 210 may be configured to receive a retention member, such as a ball 304. The ball 304 may, for example, be a ceramic ball. Prior to the start of the slumping process, the ball 304 is received in the upper end 212 of the second opening 210, as also illustrated in FIG. 3B. As the temperature increases during the slumping process, the lower end 214 expands in the direction of arrows A and width, W2 (FIG. 2A), increases. As width, W2, increases, the ball 304 also moves and is lowered in the direction of arrow B to be received by the lower end 214 as illustrated in FIG. 3C. The ball 304 may be moved via gravity or by being physically forced downward.

The ball 304 securely and removably attaches the alignment system 300 to the mold 102. Furthermore, once the temperatures returns to room temperature, the ball 304 remains in position at the lower end 214 to continue to secure the alignment system 300 to the mold 102. The alignment member 202 and the ball 304 can be removed from the slot 108.

In one embodiment, the slot 108 used to secure the alignment system 300 to the mold 102 has a cavity. The cavity may have a first side 310, a second side 312 opposite the first side 310, and a bottom 314 between the first side 310 and the second side 312 thereby forming the cavity. The second side 312 can be formed at an angle such that the slot 108 has a slight taper towards the bottom 314. As the ball 304 drops into the cavity, the tapered cavity provides for a tighter fit between the ball 304 and mold 102, which provides a secure yet releasable fit of the alignment system 300 to the mold 102.

As the temperature increases during the slumping process, the alignment member 202 can, in one embodiment, continuously bends or moves in the direction of arrow C. The alignment system 300 continuously moves away from the glass member 112 as the glass member 112 simultaneously expands and/or bends. Continuous movement of the alignment system 300 in a direction away from the mold ensures that the alignment member 202 moves away from the glass member 112 as the glass member 112 expands. The contact member 302 then releases the glass member 112 to allow the glass member 112 to bend (e.g., slump) around the mold 102 without interference. In other words, the glass member 112 is released from the contact member 302 as the alignment member 302 bends in the direction of arrow C.

Clearance from the alignment system 300 during the glass slumping process prevents the glass member 112 from hanging up on the alignment system 300, The alignment system 300 can also prevent defects from forming on the finished edges of the glass member 112 as the glass member 112 becomes more malleable. Still further, the alignment system 300 does not cause any undesired chemical reaction at the contact points between the glass member and the contact member.

The ball can securely retain the alignment members 300 to the mold 102 without the use of screws or any other similar permanent means of attachment to attach the alignment member to the mold. This prevents the mold from cracking, misaligning a glass member, and/or causing the permanent attachment to become loose since the screws and other rigid means of attachment expand while in a mold as the temperature increases during the slumping process.

Figure 4A:
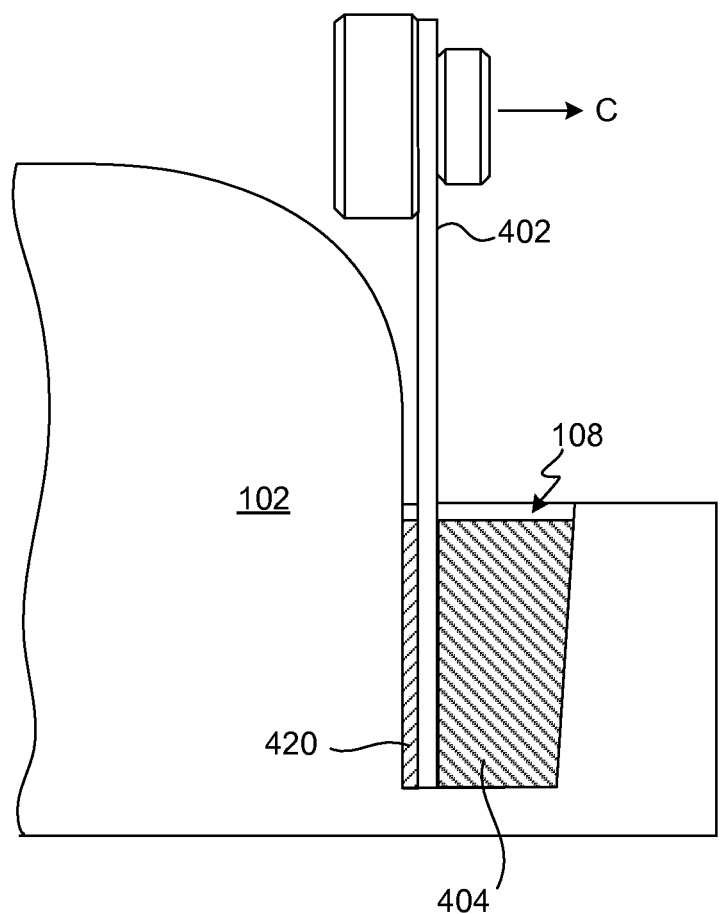
FIGS. 4A and 4B illustrate side views of other embodiments of an alignment member.
Figure 4B:
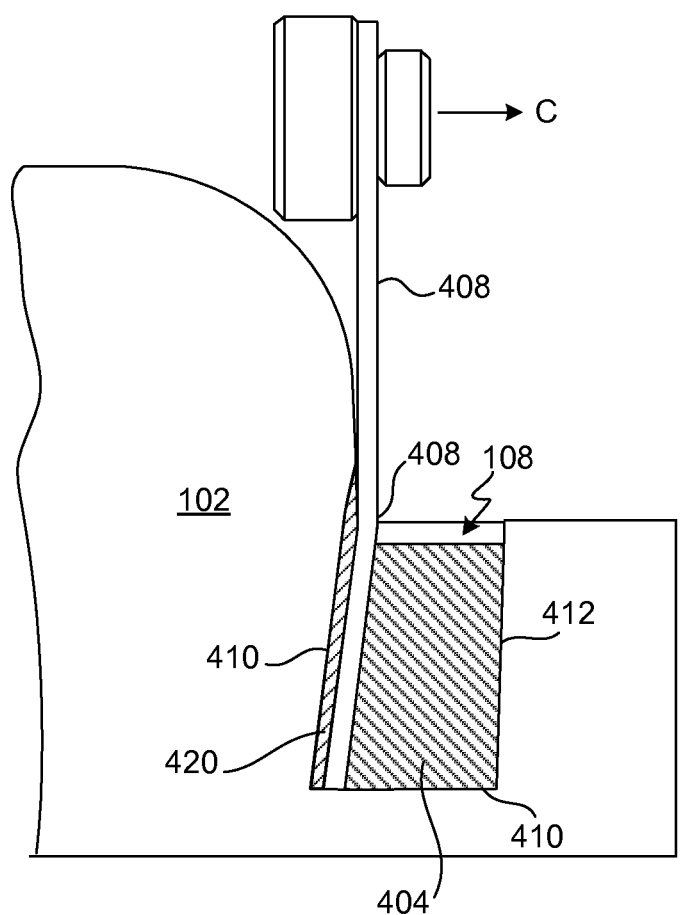

FIGS. 4A and 4B illustrate side views of other embodiments of an alignment member. Referring to FIG. 4A, in one embodiment, an alignment member 402 may be releasably secured to the mold 102 in the slot 108 with the use of a low temperature melting material 404, such as a wax. The low temperature material 404 may fill the cavity of the slot 108 to press the alignment member 402 against the mold 102. In one embodiment, the alignment member 402 may be secured directly to the mold 102, at the bottom end, with the use of a low temperature adhesive 420 that evaporates or burns away as the temperature increases during the slumping process. As the temperature increases during the slumping process, the low temperature material (i.e., the low temperature melting material 404 and/or the low temperature adhesive 420) will melt or burn away causing the alignment member 402 to move discretely in the direction of arrow C or in a direction away from the mold 102. In this embodiment, the alignment member 402 may be made from a single metal or a plurality of metals (e.g., bi-metallic). Additionally, the alignment member 402 does not need to have a second opening (FIG. 2A).

In another embodiment, as illustrated in FIG. 4B, an alignment member 406 may be formed having a slight bend 408 to ensure that the alignment member 406 moves away from the glass member. In another embodiment, the slot 108 may have a cavity having a first side 410, a second side 412 opposite the first side 410, and a bottom 410. The first side 410 may be formed at an angle such that the width of the slot 108 at the bottom 410 is greater than a width at the top of the slot 108. In both embodiments, the slight bend 408 in the alignment member 406 ensures that as the low temperature melting material 404 and/or the low temperature adhesive 420 melts away during the slumping process, the alignment member 406 moves away from the glass member in the direction of arrow C.

The use of a low temperature melting material may result in contamination of the oven or unit where the glass slumping process occurs. Thus, it may be necessary to decontaminate the oven or glass slumping process unit for subsequent processes. Additionally, replacement of the low temperature material may be required for subsequent processes.

Figure 5:
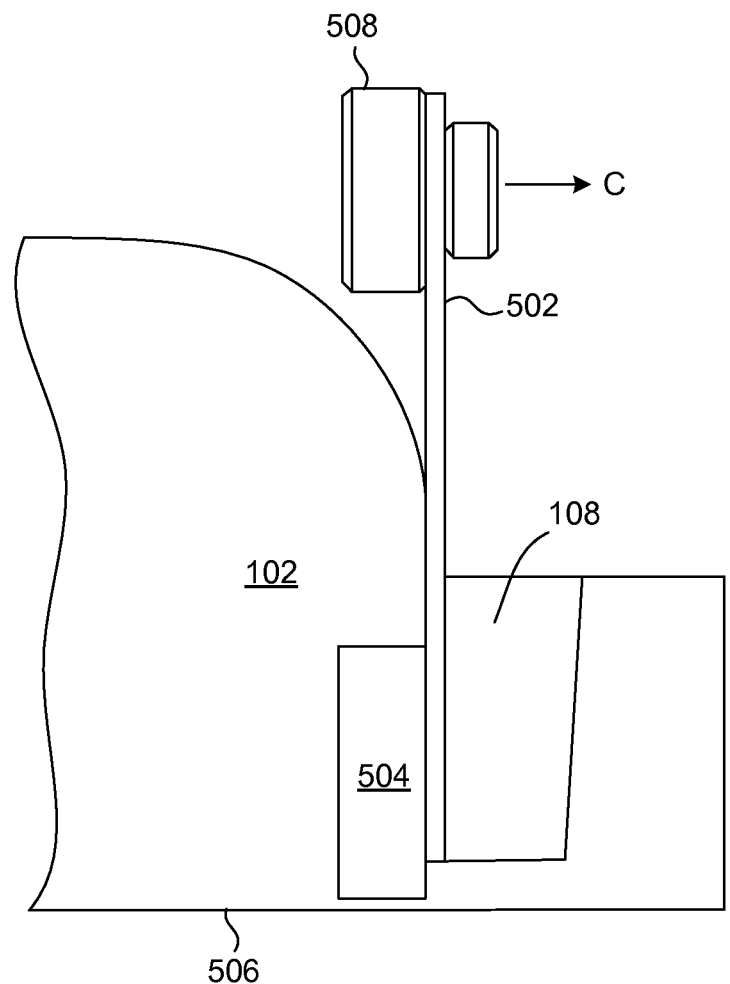
FIG. 5 illustrates a side view of another embodiment of an alignment system.

FIG. 5 illustrates a side view of yet another embodiment of the alignment system. An alignment member 502 may be secured to the mold 102 using a magnet 504, such as a neodymium magnet. The magnet 504 may be located proximate to a base 506 of the mold 102 to attract and secure the alignment member 502 to the mold 102 in the slot 108. As the temperature increases during the slumping process, the magnet 504 may lose its ferromagnetic properties (the temperature at which this occurs varies based upon the Curie point of the specific magnet) and discretely releases the alignment member 502 from the mold. The alignment member 502 then moves in a direction away from the mold 102 in the direction of arrow C. A contact member 508 no longer contacts the glass member 112 which allows the glass member 112 to bend around the mold 102 without interference.

Due to the high temperature necessary for the glass slumping process, the magnets may permanently loose its ferromagnetic properties. Thus, the magnets may need to be replaced or re-magnetized.

Figure 6A:
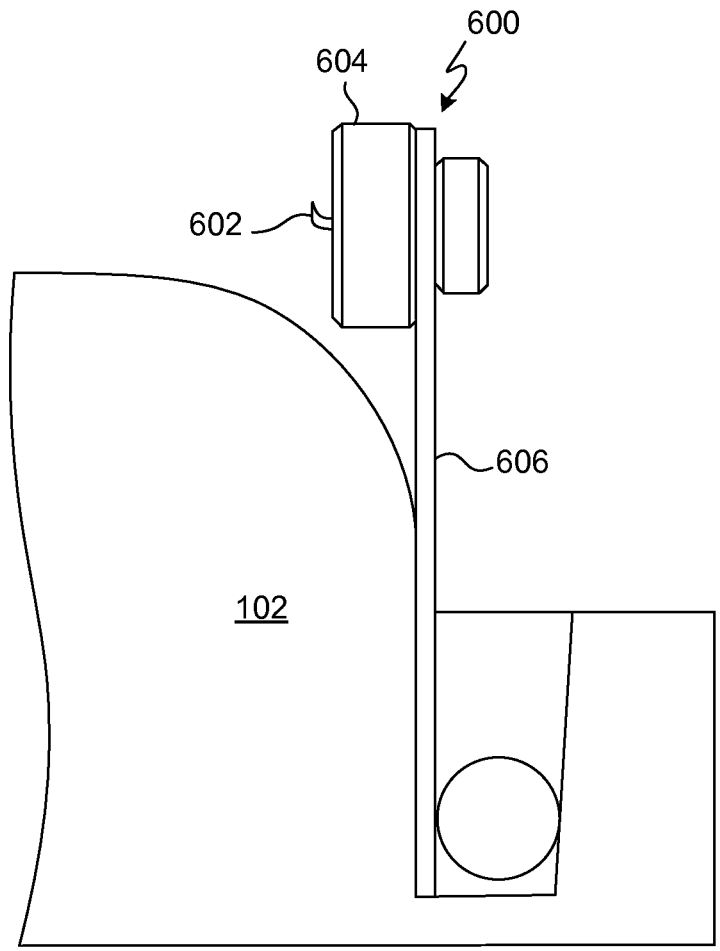
FIGS. 6A and 6B illustrate a side view of still another embodiment of an alignment system.
Figure 6B:
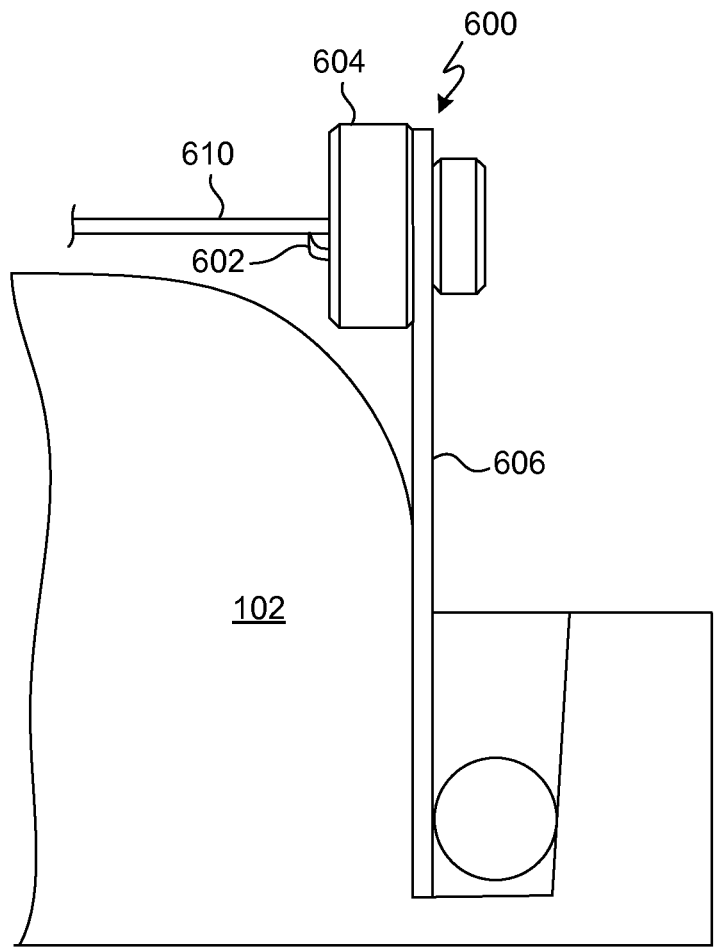

FIGS. 6A and 6B illustrate a side view of still another embodiment of an alignment system 600. Referring to 6A, the alignment system 600 may have an attachment member 602 extending outwardly from a contact member 604. Although illustrated coupled to the contact member 604, in another embodiment, the attachment member 602 may be attached directly to the alignment member 606 without the use of the contact member 602.

As illustrated in FIG. 6B, a glass member 610 may be in contact with the attachment member 602 and the contact member 602. In another embodiment, the glass member 610 may just be in contact with the attachment member 602. As illustrated, the attachment member 602 may have a hook shape. This ensures that little to no contamination to the glass member occurs. However, the shape of the attachment member 602 is not intended to be limiting as the attachment member 602 may be formed in any desired shape or formation.

Figure 7:
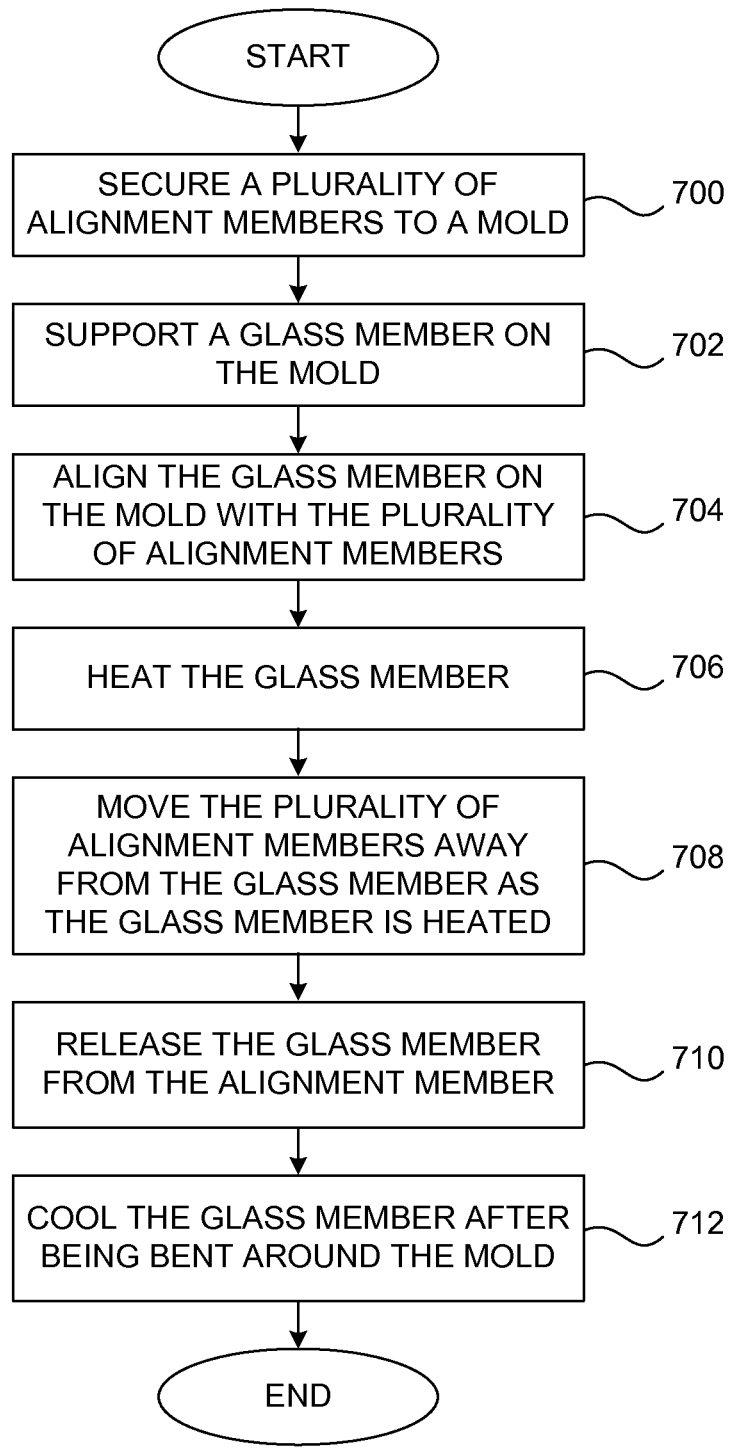
FIG. 7 illustrates a flow chart of an embodiment of a glass slumping process.

In one embodiment, as the temperature increases during the slumping process, the attachment member 602 may melt, evaporate, or burn away, which allows the glass member to bend around the mold 102 without interference. The attachment member 602 may be made from any low temperature material discussed above, such as a wax. The attachment member 602 may also be formed of a low temperature aluminum or tin FIG. 7 illustrates a flow chart of an embodiment of a glass slumping process. The glass slumping process may occur in an oven or on a conveyer belt to process a glass member. A plurality of alignment members can be removably secured to a mold at 700. Each of the alignment members may be secured, at a bottom end, in a corresponding slot on the mold with a retention member. The retention member may be a low temperature material, magnet, or a ball to secure the alignment member to the mold.

The glass member can be supported on the mold at 702. The alignment members may also align the glass member on the mold at 704. For example, the alignment member may align the center of the glass member with the center of the mold. A contact member on each of the plurality of alignment members contacts the glass member to provide a slight interference with the glass member to retain the glass member on the mold.

Once aligned, the glass member can be heated at 706. The temperature of the glass slumping process may vary based upon the type of glass, however, the glass member may be heated to a temperature of between about 500° C. to about 800° C. The glass member may then be heated for between about 5 minutes to 50 minutes. In a specific embodiment, the glass member is heated for about 10 minutes.

Simultaneously, as the temperature increases and the glass member is heated, each of the plurality of alignment members move away from the glass member at 708. The movement of the glass member as a result of heating can be automatic (i.e., without user action). As discussed above, the alignment members may move away from the glass member discretely or continuously. In one embodiment, the alignment member may be bi-metallic such that one metal expands at a faster rate than a second metal. This causes the alignment member to continuously bend and move away from the glass member as it is heated. In another embodiment, the alignment member may be secured to the mold with a low temperature material, such as a wax or adhesive, that melts, burns, or evaporates at high temperatures. The alignment member may then discretely move away from the glass member as the low temperature material is evaporated or melted. In still another embodiment, the alignment member may be secured to the mold with a magnet. At higher temperatures, the magnet can lose its ferromagnetic properties and releases the alignment member from the mold. The alignment member may then discretely move away from the glass member. Accordingly, the movable alignment system allows the glass member to bend around the mold without any interference from the alignment system. The heated glass member is thus released from the alignment members at 710. After the glass member has been fully bent or shaped (e.g., fully slumped) around the mold, the glass member is then cooled at 712.

The techniques describe herein may be applied to a variety of electronic devices including but not limited handheld electronic devices, portable electronic devices and substantially stationary electronic devices. Examples of these include any known consumer electronic device that includes a display. By way of example, and not by way of limitation, the electronic device may correspond to media players, mobile phones (e.g., cellular phones), user input device (e.g., mouse, touch-sensitive devices), PDAs, remote controls, notebooks, tablet PCs, monitors, all in one computers and the like.

Although only a few embodiments of the present invention have been described, it should be understood that the present invention may be embodied in many other specific forms without departing from the spirit or the scope of the present invention. By way of example, the steps associated with the methods of the present invention may vary widely. Steps may be added, removed, altered, combined, and reordered without departing from the spirit of the scope of the present invention.

The various aspects, features, embodiments or implementations of the invention described above can be used alone or in various combinations.

While this specification contains many specifics, these should not be construed as limitations on the scope of the disclosure or of what may be claimed, but rather as descriptions of features specific to particular embodiment of the disclosure. Certain features that are described in the context of separate embodiments can also be implemented in combination. Conversely, various features that are described in the context of a single embodiment can also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

In one embodiment, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

While embodiments and applications have been shown and described, it would be apparent to those skilled in the art having the benefit of this disclosure that many more modifications than mentioned above are possible without departing from the inventive concepts herein. For example, high temperature wires, such as nickel wires, may be coupled to the alignment system. During the slumping process, the wires may be physically pulled or contracted to move the alignment members away from the glass member as the glass member becomes malleable. Other means to move the alignment members away from the glass member are contemplated.

What is claimed is:

1. A glass slumping method, comprising:
   removably securing a bottom end of a plurality of alignment members to a mold;
   supporting and aligning a glass member on the mold wherein each of the plurality of alignment members contact the glass member to retain the glass member in position;
   subsequently heating the glass member;
   moving at least one of the plurality of alignment members away from the glass member as the glass member is heated to allow the glass member to bend around the mold without interference from the alignment members, thereby releasing the heated glass member from the at least one of the alignment members; and
   cooling the glass member after being bent around the mold,
   wherein at least one of the plurality of alignment members comprises an opening at the bottom end, the opening having an upper end configured to receive a ball and the upper end having a width that is greater than a width of a lower end of the opening.

2. The method of claim 1, wherein the moving at least one of the plurality of alignment members comprises:
   moving each of the plurality of alignment members away from the glass member as the glass member is heated.

3. The method of claim 1, wherein the removably securing further comprises:
   providing a retention member to removable secure the bottom end of each of the plurality of alignment members to the mold,
   wherein at least one of the retention members are configured to release away from the glass member as the glass member is heated.

4. The method of claim 1, wherein the method comprises:
   expanding the width of the lower end as the glass member is heated; and
   moving the ball toward the lower end as the width of the lower end expands to cause the alignment member to move away from the glass member.

5. The method of claim 1, wherein said method further comprises:
   joining at least two metals to form at least one of the plurality of alignment members,
   wherein as the glass member is heated, due to different rates of thermal expansion, the at least one of the plurality of alignment members bends away from the glass member.

6. The method of claim 1, wherein said method further comprises:
   joining at least two metals to form at least one of the plurality of alignment members,
   wherein as the glass member is heated, due to different rates of thermal expansion, the at least one of the plurality of alignment members bends away from the glass member.

7. The method of claim 6, wherein the at least one of the plurality of alignment members are formed from a nickel alloy and steel.

8. The method of claim 1, wherein said method further comprises:
   joining at least two metals to form each of the plurality of alignment members,
   wherein as the glass member is heated, due to different rates of thermal expansion, each of the plurality of alignment members bends away from the glass member to release the glass member.

9. The method of claim 8, wherein each of the plurality of alignment members are formed from a nickel alloy and steel.

10. The method of claim 1, wherein the supporting and aligning comprises contacting the center of the glass member with the mold.

11. The method of claim 1, wherein a top end of the at least one of the alignment members comprising a contact member configured to apply a slight interference on the glass member to align or secure the glass member to the mold.

12. A glass slumping method, comprising:
   removably securing a bottom end of a plurality of alignment members to a mold;
   supporting and aligning a glass member on the mold wherein each of the plurality of alignment members contact the glass member to retain the glass member in position;
   subsequently heating the glass member;
   moving at least one of the plurality of alignment members away from the glass member as the glass member is heated to allow the glass member to bend around the mold without interference from the alignment members, thereby releasing the heated glass member from the at least one of the alignment members; and
   cooling the glass member after being bent around the mold,
   wherein the removably securing comprises providing a retention member to removable secure the bottom end of each of the plurality of alignment members to the mold,
   wherein at least one of the retention members are configured to release away from the glass member as the glass member is heated, and wherein the retention member is a magnet or a low temperature melting material.

13. A glass slumping method, comprising:
removably securing a bottom end of a plurality of alignment members to a mold;
supporting and aligning a glass member on the mold wherein each of the plurality of alignment members contact the glass member to retain the glass member in position;
subsequently heating the glass member;
moving at least one of the plurality of alignment members away from the glass member as the glass member is heated to allow the glass member to bend around the mold without interference from the alignment members, thereby releasing the heated glass member from the at least one of the alignment members; and
cooling the glass member after being bent around the mold,
wherein the removably securing comprises providing a retention member to removable secure the bottom end of each of the plurality of alignment members to the mold, and
wherein each of the retention members are configured to release away from the glass member as the glass member is heated.

14. The method of claim 13, wherein each of the plurality of alignment members further comprise an opening at the bottom end, the opening having an upper end configured to receive a ball and the upper end having a width that is greater than a width of a lower end of the opening.

15. The method of claim 13, wherein a top end of each of the alignment members comprising a contact member configured to apply a slight interference on the glass member to align and secure the glass member to the mold.

16. The method of claim 13, wherein at least one of the plurality of alignment members comprises an opening at the bottom end, the opening having an upper end configured to receive a ball and the upper end having a width that is greater than a width of a lower end of the opening.

17. The method of claim 13, wherein a top end of the at least one of the alignment members comprising a contact member configured to apply a slight interference on the glass member to align or secure the glass member to the mold.

18. The method of claim 13, wherein the removably securing comprises:
providing a retention member to removable secure the bottom end of each of the plurality of alignment members to the mold,
wherein at least one of the retention members are configured to release away from the glass member as the glass member is heated.

19. The method of claim 13, wherein the supporting and aligning comprises contacting the center of the glass member with the mold.

20. A glass slumping method, comprising:
removably securing a bottom end of a plurality of alignment members to a mold;
supporting and aligning a glass member on the mold wherein each of the plurality of alignment members contact the glass member to retain the glass member in position;
subsequently heating the glass member;
moving at least one of the plurality of alignment members away from the glass member as the glass member is heated to allow the glass member to bend around the mold without interference from the alignment members, thereby releasing the heated glass member from the at least one of the alignment members; and
cooling the glass member after being bent around the mold,
wherein a to end of the at least one of the alignment members comprising a contact member configured to apply a slight interference on the glass member to align or secure the glass member to the mold, and
wherein the contact member and the glass member are formed from substantially similar materials.

21. The method of claim 20, wherein a top end of the at least one of the alignment members comprising a contact member configured to apply a slight interference on the glass member to align or secure the glass member to the mold.

22. The method of claim 21, wherein the contact member and the glass member are formed from substantially similar materials.

23. The method of claim 20, wherein at least one of the plurality of alignment members further comprise an opening at the bottom end, the opening having an upper end configured to receive a ball and the upper end having a width that is greater than a width of a lower end of the opening.

24. The method of claim 20, wherein the removably securing comprises:
providing a retention member to removable secure the bottom end of each of the plurality of alignment members to the mold,
wherein at least one of the retention members are configured to release away from the glass member as the glass member is heated.

25. The method of claim 24, wherein the retention member is a magnet or a low temperature melting material.

* * * * *